United States Patent [19]

Peters

[11] Patent Number: 5,709,430
[45] Date of Patent: Jan. 20, 1998

[54] BICYCLE SEAT

[76] Inventor: Richard James Peters, 78 Davis Blvd. Apt. #9, Tampa, Fla. 33606

[21] Appl. No.: 307,148

[22] Filed: Sep. 16, 1994

[51] Int. Cl.$^6$ ............................................................ B62J 1/08
[52] U.S. Cl. ................ 297/201; 297/215.13; 297/215.14; 297/215.15
[58] Field of Search ........................ 297/201, 202, 297/215.13, 215.14, 215.15; 280/288.4

[56] References Cited

U.S. PATENT DOCUMENTS

| | | | |
|---|---|---|---|
| 531,333 | 12/1894 | Rogers | 297/201 |
| 603,943 | 5/1898 | Clifford | 297/201 |
| 608,682 | 8/1898 | Jamieson | 297/201 |
| 642,191 | 1/1900 | Wright | 297/201 |
| 694,875 | 3/1902 | Meighan | 297/201 |
| 4,387,925 | 6/1983 | Barker et al. | 297/201 |
| 4,512,608 | 4/1985 | Erani | 297/201 |

FOREIGN PATENT DOCUMENTS

| | | | |
|---|---|---|---|
| 373620 | 3/1907 | France | 297/201 |
| 30160 | 12/1897 | United Kingdom | 297/201 |
| 229525 | 2/1925 | United Kingdom | 297/201 |

*Primary Examiner*—Peter R. Brown
*Assistant Examiner*—David E. Allred

[57] ABSTRACT

An improved bicycle seat for relieving pressures to sensitive areas and transferring them to the sit bones of the rider. The bicycle seat comprising a dual platforms with a plurality of adjustments. The adjustments allowing the platforms to independently slide horizontally forwards and backwards, tilt forwards and backwards, slide horizontally inwards and outwards, and tilt inwards and outwards.

7 Claims, 3 Drawing Sheets

BICYCLE SEAT

BACKGROUND OF INVENTION

1. Field of the Invention

This invention is generally related to an improvement in bicycle seat design and comfort. More specifically, this invention uses a dual platform bicycle seat design with a plurality of adjustments for improved comfort and riding efficiency.

2. Description of the Prior Art

There have been many variations in bicycle seat designs during it's evolution with many utilizing a single platform having a narrow nose to support the rider. These single platform bicycle seats, by design, place excessive pressures on sensitive tissues in the groin area and thus are uncomfortable during long periods of riding. The present invention has solved the problem of relieving pressure to sensitive tissues caused by single platform bicycle seats by using a dual platform bicycle seat and omitting the nose section. Additionally, the present invention has provided a plurality of adjustments not found in single platform bicycle seat designs.

Several approaches have been provide for examples in Hodges of U.S. Pat. No. 5,123,698 "An adjustable bicycle seat includes first and second support platform laterally separated by first a second relatively slidable, horizontally oriented, overlapping flanges respectively joined to the first and second support platforms and having a bolt extending though a passage therein to releaseably secure the first and second platforms in laterally spaced relation. Each support platform includes an integral spring rotatably mounted in a clamp attachable to a bicycle frame. Apertures formed in the first and second flanges are selectively alignable when the bolt is removed from the passage to permit selective lateral and angular positioning of the first and second support platforms in a horizontal plane, and the bolt is engageable in the aligned apertures to secure the support platforms in such position."

Another approach is taught by Rafter, in U.S. Pat. No. 5,297,846 wherein the abstract states "Disclosed herein is a bicycle seat assembly designed for optimal comfort and riding efficiency. The assembly includes a forward, upward extending rigid support member adjustably attached to the seat tube on a bicycle. In one embodiment, the support member has an adjustable collar assembly which enables the support member to be attached to a standard seat post which is inserted into the seat tube. A v-shaped, extension arm is pivotally attached to the support member. The extension arm may be rotated between a rearward extending position and a forward extending position. The standard bicycle seat called a primary seat structure herein, is attached to the rear surface. When the extension arm is disposed in the rearward extending position, the primary seat structure may be used for normal riding. When the rider climbs an incline surface, the extension arm is rotated forward in a counter-clockwise direction to the forward extended position. If the extension arm is disposed in the forward extended position, the secondary seat structure is disposed in a position to support a rider in a standing position. The distance of the secondary seat structure is sufficient so that pedal distance is maintained for full leg extension."

Still another approach is taught in the art of Hobson of U.S. Pat. No. 4,877,286 wherein the abstract states "The present invention provides a bicycle seat with interchangeable horns and one in which the support platforms may be adjusted to a broader base or to a narrower base."

In U.S. Pat. No. 4,387,92 "A bicycle seat including two support platforms immovably mounted on a support member The top surface is curved in a particular manner."

While some prior arts contain certain similarities of the present invention, none of them teach, or suggest all the features and advantages as disclosed herein.

SUMMARY OF THE INVENTION

A problem caused by typical bicycle seats are that they are too narrow in design and therefore place excessive pressures on sensitive tissues that can damage nerves and blood vessels as well as cause temporary impotence in males. Thus, it is imperative to find a seat arrangement that will transfer the weight from the sensitive areas to the ischial tuberosities, or sit bones. The average person can expect a dramatic improvement in comfort while using the bicycle seat disclosed herein. This is particularly true when the person has ridden the bicycle over extended periods of time.

Accordingly, it is a primary object of this invention to provide a bicycle seat that will transfer the weight of the person from the sensitive tissues to the sit bones. This is achieved by providing two platforms aligned directly beneath the sit bones and eliminating the nose section of typical single platform bicycle seats.

Another object of this invention is to provide a dual platform seat that is slidably adjusted horizontally forwards and backwards. The platforms are slidably attached to a pair of horizontally extending arms. The horizontal arms are positioned parallel relative to the front and rear sectors of the bicycle.

Still another object of this invention is to provide a dual platform seat that can be slidably adjusted horizontally inwards and outwards. Since people vary in sizes, their sit bones also will vary in width. This adjustment will enable riders to adjust the dual platforms directly beneath their sit bones. If preferred, the dual platforms can be abutted together thereby forming a single platform as in a conventional bicycle seat.

Still yet another object of this invention is to provide a dual platform bicycle seat that can tilt inwards and outwards for a unique feel. This type of adjustment will help the rider obtain more of a cradle feel when the platforms are tilted inwards.

A further object of this invention is to provide a dual platform bicycle seat that can tilt forwards and backwards. The dual platforms are preferably tilted forward to the extent that the platforms do not impede the rider's legs during pedalling.

Still a further object of this invention is to provide a dual platform bicycle seat where the dual platforms can be adjusted independently thereby allowing the rider combinations of the adjustments and movements thereof.

Another object of this invention is to provide support arms having a particular design that will give spring action to the seat platforms. The design of the U-shaped support arms that are attached to the platform seats and the mounting block will provide a shock absorbing spring action.

In carrying out this invention in the illustrative embodiment thereof, a dual platform bicycle seat is provided to eliminate pressures away from sensitive tissues and the seat further having a plurality of adjustments.

Conveniently, the user slides a mounting block onto a seat post and adjusts the mounting block in a relatively straight position. The user then locks the block into a fixed position via a locking bolt provided on the mounting block.

The user then attaches the bottom of the seat platforms to the seat clamps provided. Next, each seat clamp is inserted over a seat support arm and adjusted forwards or backwards along the seat support arm. The seat clamps are then tilted either inwards or outwards before the lock bolts built in seat clamps are tightened.

Next, the block attachment arms are inserted into a mounting block via block cavities built therein. The block attachment arms are then adjusted to position the seat platforms, horizontally inwards or outwards so that the seat platforms are preferably beneath the sit bones of the rider. A further adjustment can be made by rotating the block attachment arms forwards or backwards thereby tilting the seat platforms to a more suitable position. The block attachment arms are then locked into a fixed position via locking bolts provided in the mounting block.

BRIEF DESCRIPTION OF THE DRAWINGS

This invention, together with other objects, features, aspects and advantages thereof, will be more clearly understood from the following description, considered in conjunction with the accompanying drawings.

Three sheets of drawings are furnished, sheet one contains FIG. 1 an orthographic view of the invention fully assembled. The dual seat platforms in the figure are separated a given distance dependent upon the width of the rider's sit bones.

Figure 2:
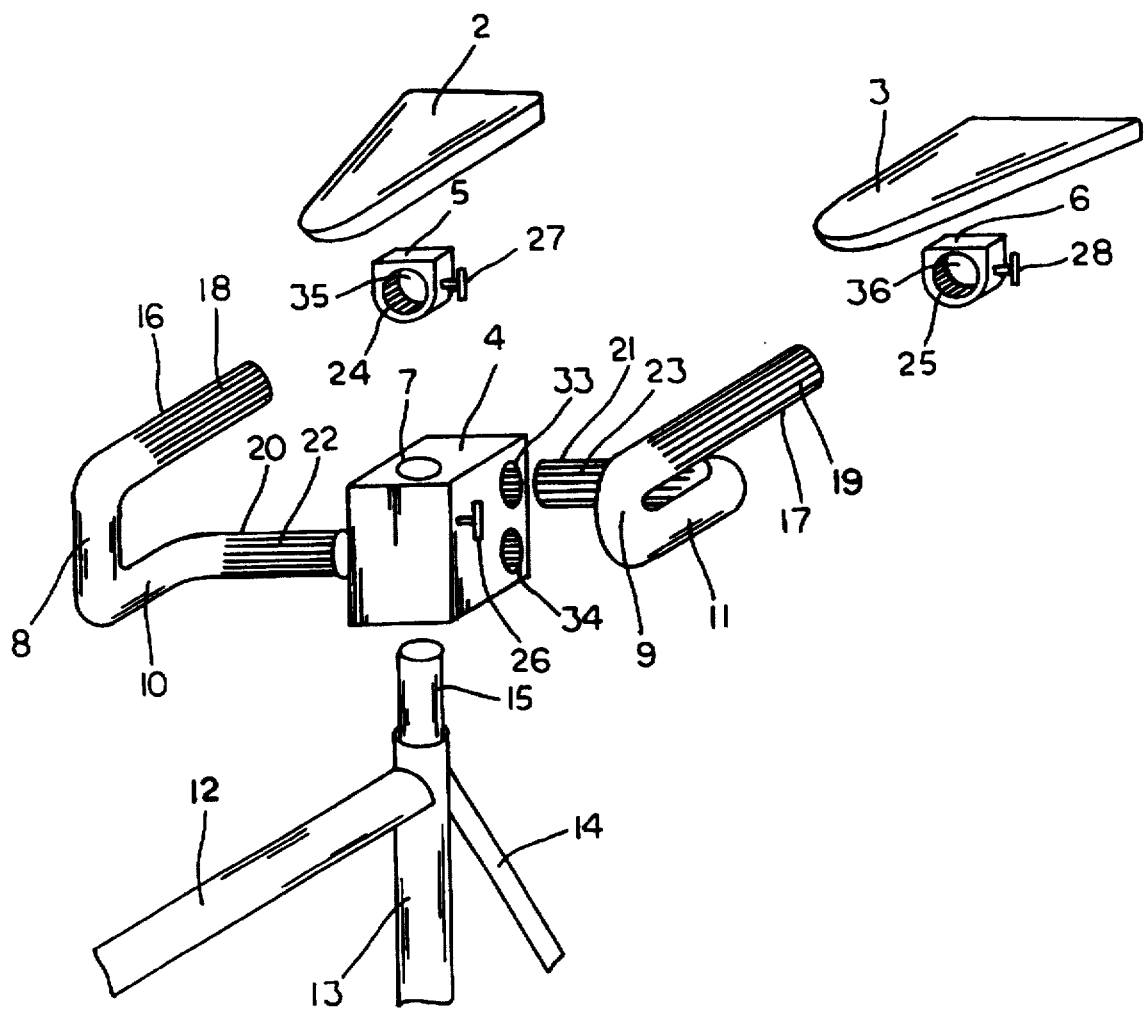

Sheet two contains FIG. 2 an orthographic view of the invention in a disassembled position. Here we clearly see the unique support arms and how they attach to the seat clamps and mounting block.

Figure 3:
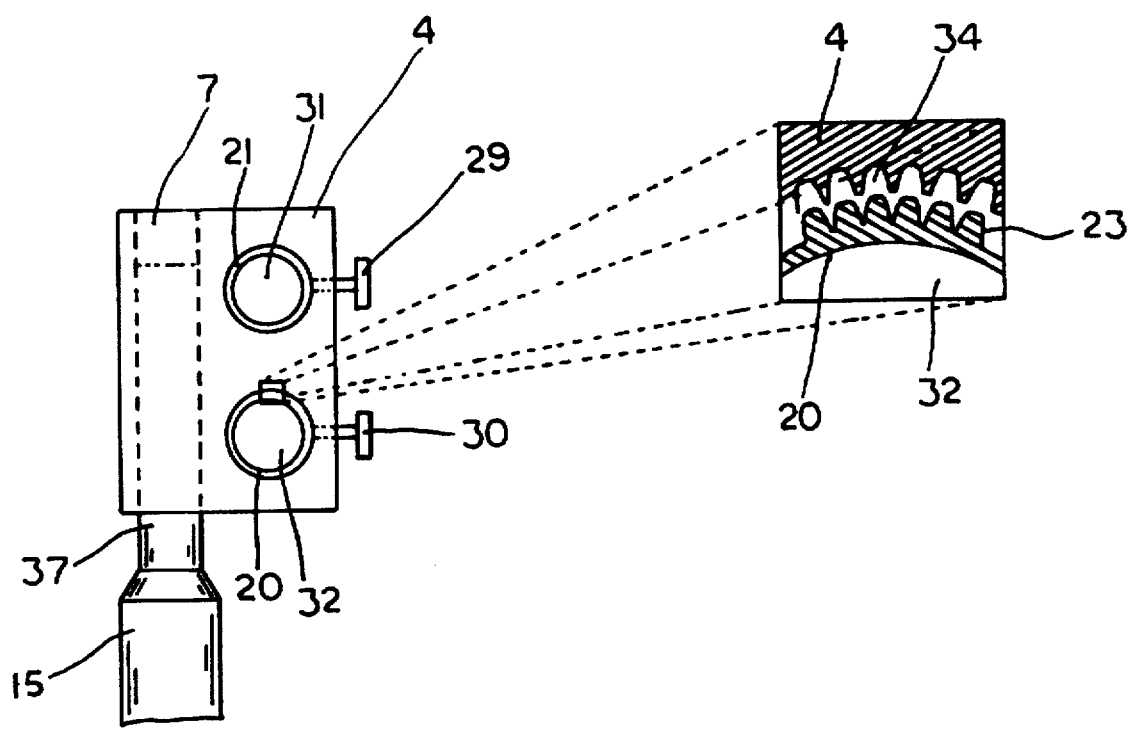

Sheet three contains FIG. 3, a side view of the mounting block with an enlarged portion of the positive ridges and negative grooves. Here we can see how the positive ridges and negative grooves interlock to prevent the seat clamps from rotating on the seat support arms.

DESCRIPTION OF THE PREFERRED EMBODIMENTS

Figure 1:
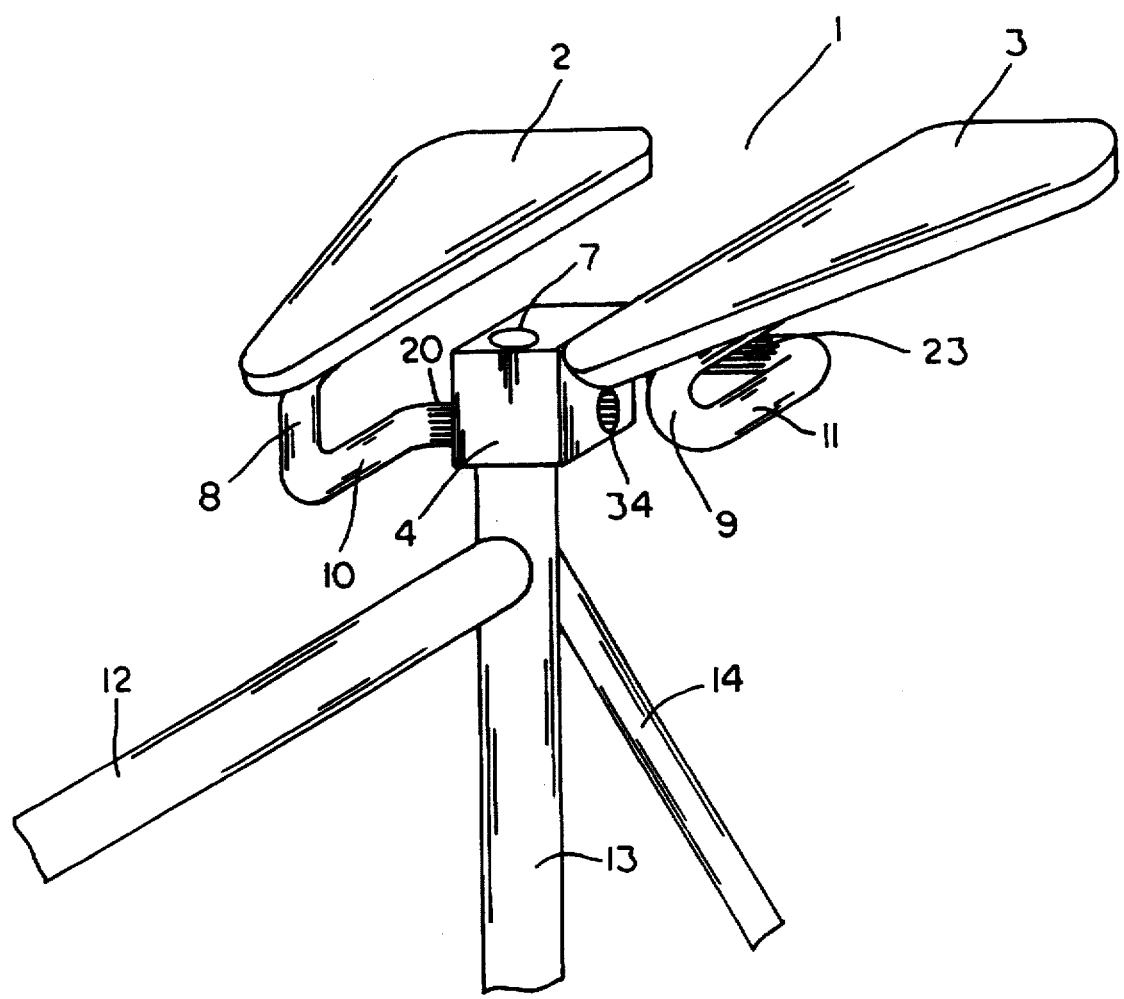

Referring now to FIG. 1, a bicycle seat referred to generally by the reference numeral 1 is made of two seat platforms 2 and 3. A mounting block 4 is shown having a cavity 7 to accept a seat post. In the figure, negative grooves 34 can be seen from one cavity in the mounting block 4 that is to accept a block attachment arm 20. Horizontal support arms 10 and 11 are shown attached to vertical support arms 8 and 9 respectively. Vertical support arms 8 and 9 are in turn attached to seat support arms 16 and 17 respectively (not shown in FIG. 1). The support arms 10 and 11 are used to connect vertical support arms 8 and 9 to block attachment arms 20 and 21 respectively; The vertical support arms 8 and 9 are needed to provide adequate space between a seat support arm and the horizontal support arm. Also shown in the figure are the raised ridges 23 of a block attachment arm. The bicycle frame having a horizontal frame member 12, a vertical frame member 13, and a frame member 14, with each having their unique purpose.

In FIG. 2, we see the bicycle seat in a disassembled position. A pair of seat platforms 2 and 3 ready to be affixed to a pair of seat clamps 5 and 6 respectively. The seat clamps 5 and 6 having locking bolts 27 and 28 attached thereto clamp cavities 35 and 36 therein, and negative grooves 24 and 25 attached to the clamp cavities respectively. A mounting block 4 is shown having a plurality of cavities therein. A seat post cavity 7 is attached therein and arranged in a vertical fashion. A pair of block cavities 31 and 32 (not shown in the figure) having negative grooves 33 and 34 respectively attached thereto. The grooves 33 and 34 being arranged in an equally spaced and horizontally linear fashion relative to the mounting block 4. The mounting block 4 further having a locking bolt 26 to lock a seat post 15 into a fixed position once the seat post 15 is inserted into the cavity 7.

A pair of block attachment arms 20 and 21 are aligned and ready to be inserted into the mounting block 4. The block attachment arms 20 and 21 having positive ridges 22 and 23 attached thereto. The positive ridges 22 and 23 being equally spaced and aligned in a parallel fashion with the negative grooves 34 and 33 respectively. Affixed to the block attachment arms 20 and 21 are horizontal support arms 10 and 11 respectively, whereby vertical support arms 8 and 9 are affixed thereto respectively. Affixed to the vertical support arms 8 and 9 are seat support arms 16 and 17 respectively. Seat support arms 16 and 17 having positive ridges 18 and 19 affixed thereto respectively are aligned with negative grooves 24 and 25 of seat clamps 5 and 6 respectively.

Referring now to FIG. 3, we see a side view of the mounting block 4 and an enlarged window of the positive ridges 23 and negative grooves 33. The mounting block 4 having cavities 31 and 32 to accept block attachment arms 21 and 20 respectively. The block attachment arms 21 and 20 are secured into a fixed position via locking bolts 29 and 30 respectively. The mounting block further having a seat post cavity 7 to accept an inner seat post 37 with the seat post 15 attached thereto.

Accordingly, a very unique, attractive apparatus is provided for a bicycle seat with dual platforms to allow for a plurality of adjustments thereby providing optimum comfort and riding efficiency.

Since minor changes and modifications varied to fit particular operating requirements and environments will be understood by those skilled in the art, the invention is not considered limited to the specific examples chosen for purposes of illustration, and includes all changes and modifications which do not constitute a departure from the true spirit and scope of this invention as claimed in the following claims and reasonable equivalents to the claimed elements.

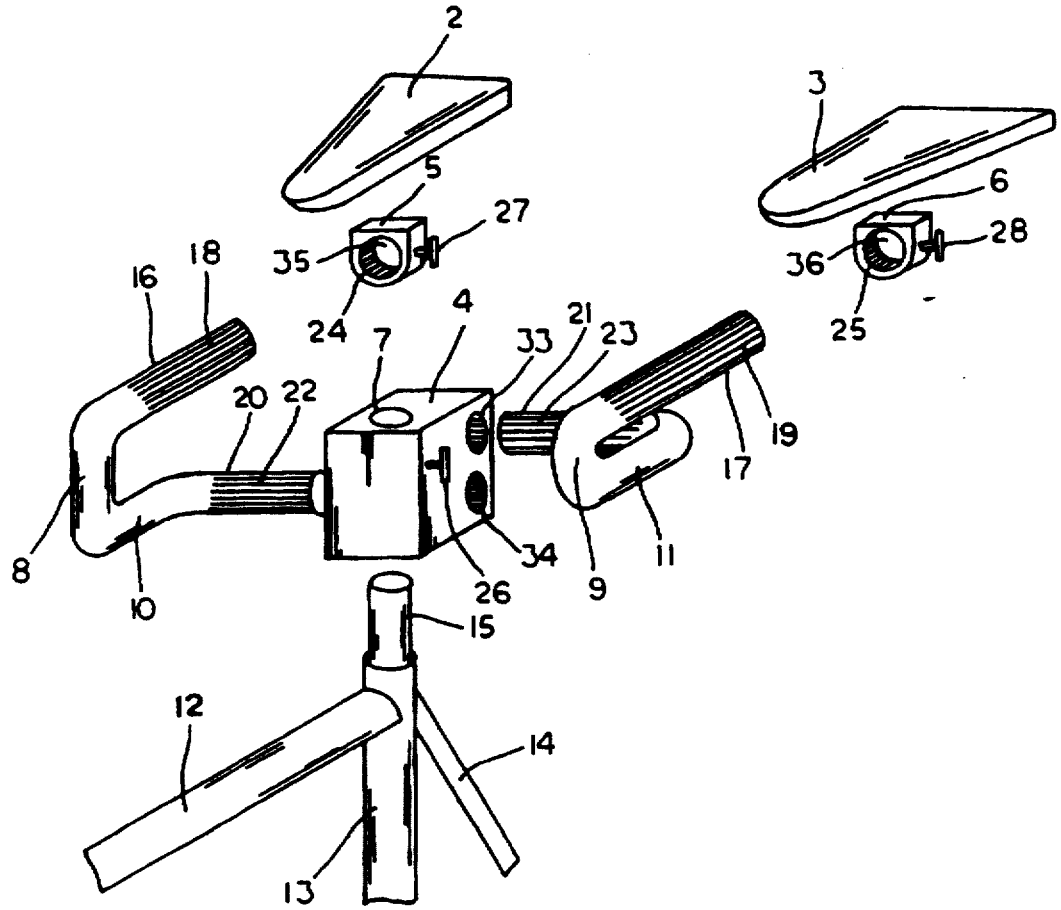

What is claimed is:

1. A bicycle seat for increasing riding comfort and efficiency to the rider, said bicycle seat comprising:
    (a) mounting block having upper and lower surfaces, and four sidewalls, said mounting block being adapted to be affixed to a bicycle seat post in a set post through-hole which extends from the upper surface to the lower surface;
    (b) a left support platform affixed to a first shaped support arm, said first support arm being affixed to said mounting block in through-hole of the mounting block which extends from one lateral side to the opposite lateral side;
    (c) a right support platform affixed to a second shaped support arm, said second support arm being affixed to said mounting block in a through-hole of the mounting block which extends from said one lateral side to said opposite lateral side below the through-hole of the first support arm;
    a means of tilting said each of said left and right seat platforms each on a respective axis of said first and second shaped support arms.

2. A bicycle seat for increasing riding comfort and efficiency to the rider, said bicycle seat comprising:

(a) a mounting block having upper and lower surfaces, and four sidewalls, said mounting block being adapted to be affixed to a bicycle seat post in a seat post through-hole which extends from upper surface to the lower surface;

(b) a left support platform affixed to a first shaped support arm, said first support arm being affixed to said mounting block in a through-hole of the mounting block which extends from one lateral side to the opposite lateral side;

(c) a right support platform affixed to a second shaped support arm, said second support arm being affixed to said mounting block in a through-hole of the mounting block which extends from said one lateral side opposite lateral side below the through-hole of the first support arm;

(d) a means of tilting each of said left and right seat platforms each on a respective axis which extends through both said lateral sides of the mounting block;

(e) a means of tilting each of said left and right seat platforms each along a respective axis which is substantially parallel to said lateral sides;

(f) a means of sliding said left and right platforms horizontally along said axes which are substantially parallel to said lateral sides;

(g) a means of sliding said left and right platforms horizontally along said axis which extends through both said lateral sides.

3. A bicycle seat for increasing riding comfort and efficiency to the rider, said bicycle seat comprising:

(a) a mounting block having upper and lower surfaces, and four sidewalls, said mounting block adapted to be affixed to a bicycle seat post, said mounting block having a seat post through-hole extending between upper and lower surfaces and two support arm through-holes positioned one above the other and extending between opposite lateral sides of the mounting block, said mounting having a plurality of locking bolts attached therein;

(b) a left support platform being rotatably and slidably affixed to a first seat support arm via a seat clamp, said seat clamp having a locking bolt affixed thereto, said first seat support arm being affixed to a first vertical support arm, said first seat support arm having positive ridges affixed thereto, said first vertical support arm being affixed to a first horizontal support arm, said first horizontal support arm being affixed to a first block attachment arm, said first block attachment arm having positive ridges affixed thereto, said first block attachment arm being rotatably and slidably affixed to said mounting block via one of said support arm through holes;

(c) a right support platform being rotatably and slidably affixed to a second seat support arm via a seat clamp, said seat clamp having a locking bolt affixed thereto, said second seat support arm being affixed to a second vertical support arm, said second seat support arm having positive ridges affixed thereto, said second vertical support arm being affixed to a second horizontal support arm, said second horizontal support arm being affixed to a second block attachment arm, said second block attachment arm having positive ridges affixed thereto, said second block attachment arm being rotatably and slidably affixed to said mounting block via other of said support arm through-holes.

4. A bicycle seat as set forth in claim 3 wherein said locking bolts of said seat clamps are capable of rigidly affixing said right and left seat platforms on said seat support arms.

5. A bicycle seat as set forth in claim 3 wherein each of said seat clamps has a cavity therein with negative grooves affixed thereto.

6. A bicycle seat as set forth in claim 5 wherein said negative grooves having capabilities to interlock with said positive ridges of said first and second seat support arms.

7. A bicycle seat as set forth in claim 3 wherein said first vertical support arm and said second vertical support arm have a given resiliency.

\* \* \* \* \*

UNITED STATES PATENT AND TRADEMARK OFFICE
CERTIFICATE OF CORRECTION

PATENT NO. : 5,709,430

DATED : January 20, 1998

INVENTOR(S) : RICHARD JAMES PETERS

It is certified that error appears in the above-identified patent and that said Letters Patent is hereby corrected as shown below:

The Title Page should be deleted to appear as per attached Title Page.

Signed and Sealed this

Twenty-fourth Day of February, 1998

Attest:

BRUCE LEHMAN

Attesting Officer  Commissioner of Patents and Trademarks

United States Patent
Peters

Patent Number: 5,709,430
Date of Patent: Jan. 20, 1998

[54] BICYCLE SEAT

[76] Inventors: Richard James Peters, 3712 W. Cass St. Apt# 22, Tampa, Fla. 33609

[21] Appl. No.: 307,148

[22] Filed: Sep. 16, 1994

[51] Int. Cl.⁶ .................................................. B62J 1/08
[52] U.S. Cl. ............. 297/201; 297/215.13; 297/215.14; 297/215.15
[58] Field of Search .................................. 297/201, 202, 297/215.13, 215.14, 215.15; 280/288.4

[56] References Cited

U.S. PATENT DOCUMENTS

| | | | |
|---|---|---|---|
| 531,333 | 12/1894 | Rogers | 297/201 |
| 603,943 | 5/1898 | Clifford | 297/201 |
| 608,682 | 8/1898 | Jamieson | 297/201 |
| 642,191 | 1/1900 | Wright | 297/201 |
| 694,875 | 3/1902 | Meighan | 297/201 |
| 4,387,925 | 6/1983 | Barker et al. | 297/201 |
| 4,512,608 | 4/1985 | Erani | 297/201 |

FOREIGN PATENT DOCUMENTS

| | | | |
|---|---|---|---|
| 373620 | 3/1907 | France | 297/201 |
| 30160 | 12/1897 | United Kingdom | 297/201 |
| 229525 | 2/1925 | United Kingdom | 297/201 |

*Primary Examiner*—Peter R. Brown
*Assistant Examiner*—David E. Allred

[57] ABSTRACT

An improved bicycle seat for relieving pressures to sensitive areas and transferring them to the sit bones of the rider. The bicycle seat comprising a dual platforms with a plurality of adjustments. The adjustments allowing the platforms to independently slide horizontally forwards and backwards, tilt forwards and backwards, slide horizontally inwards and outwards, and tilt inwards and outwards.

7 Claims, 3 Drawing Sheets